(12) United States Patent
Mair

(10) Patent No.: US 9,738,283 B2
(45) Date of Patent: Aug. 22, 2017

(54) METHOD FOR FREEING A VEHICLE BY ROCKING

(71) Applicant: ZF Friedrichshafen AG, Friedrichshafen (DE)

(72) Inventor: Roland Mair, Tettnang (DE)

(73) Assignee: ZF Friedrichshafen AG, Friedrichshafen (DE)

(*) Notice: Subject to any disclaimer, the term of this patent is extended or adjusted under 35 U.S.C. 154(b) by 141 days.

(21) Appl. No.: 14/684,551

(22) Filed: Apr. 13, 2015

(65) Prior Publication Data
US 2015/0291167 A1    Oct. 15, 2015

(30) Foreign Application Priority Data
Apr. 14, 2014  (DE) .................. 10 2014 207 082

(51) Int. Cl.
*B60W 10/02* (2006.01)
*B60W 10/06* (2006.01)
(Continued)

(52) U.S. Cl.
CPC ...... *B60W 30/18045* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS

| 7,302,333 B2 | 11/2007 | Steen et al. |
| 7,499,787 B2 * | 3/2009 | Hrovat ............. B60K 28/16 180/197 |

(Continued)

FOREIGN PATENT DOCUMENTS

| DE | 41 01 610 C1 | 8/1992 |
| DE | 101 05 749 A1 | 8/2002 |

(Continued)

OTHER PUBLICATIONS

German Search Report Corresponding to 10 2014 207 081.3 mailed Jan. 7, 2015.

(Continued)

*Primary Examiner* — Thomas G Black
*Assistant Examiner* — Demetra Smith-Stewart
(74) *Attorney, Agent, or Firm* — Davis & Bujold, PLLC; Michael J. Bujold

(57) ABSTRACT

A method of rocking a vehicle free, the vehicle having a drive-train (1) with a torque adjusting element (3) which transmits drive torque to a vehicle wheel (5). The adjusting element (3) is controlled as a function of an accelerator pedal position. In a rocking-free situation in which the vehicle wheel (5) is to be moved from a depression (6) by alternating deflection and release of the accelerator pedal (8), the driver produces a cyclically fluctuating drive torque at vehicle wheel (5). The accelerator pedal position is continually monitored and upon recognizing a beginning or imminently beginning reduction of the accelerator pedal deflection or a parameter derived therefrom, an imminent full release of the deflection of the accelerator pedal (8) is concluded and the adjusting element (3) is actuated in anticipation so that the vehicle wheel (5) is immediately freed from a drive torque that has been active until then.

17 Claims, 1 Drawing Sheet

(51) Int. Cl.
*B60W 30/18* (2012.01)
*B60W 10/11* (2012.01)

(52) U.S. Cl.
CPC ......... *B60W 10/11* (2013.01); *B60W 2520/04* (2013.01); *B60W 2520/06* (2013.01); *B60W 2540/10* (2013.01); *B60W 2540/106* (2013.01); *B60W 2710/027* (2013.01); *B60W 2710/1005* (2013.01); *B60W 2710/1022* (2013.01); *B60W 2720/30* (2013.01)

(56) References Cited

U.S. PATENT DOCUMENTS

| | | | | |
|---|---|---|---|---|
| 7,792,625 | B2* | 9/2010 | Hrovat | B60K 28/16 701/82 |
| 8,442,735 | B2* | 5/2013 | Hrovat | B60T 8/172 180/116 |
| 8,630,774 | B2* | 1/2014 | Holub | F16H 61/12 701/51 |
| 8,725,368 | B2* | 5/2014 | Pudvay | F16H 59/12 701/51 |
| 9,037,341 | B2* | 5/2015 | James | B60W 50/14 701/34.4 |
| 2008/0204214 | A1 | 8/2008 | Reith et al. | |
| 2014/0372012 | A1* | 12/2014 | Darnell | B60W 50/10 701/110 |
| 2015/0291166 | A1* | 10/2015 | Mair | B60W 30/18045 701/68 |

FOREIGN PATENT DOCUMENTS

| | | |
|---|---|---|
| DE | 101 09 662 A1 | 9/2002 |
| DE | 101 28 853 A1 | 12/2002 |
| DE | 10 2004 017 422 A1 | 10/2005 |
| DE | 10 2005 023 246 A1 | 11/2006 |
| DE | 10 2005 023 247 A1 | 11/2006 |
| DE | 10 2006 034 411 A1 | 1/2008 |
| DE | 60 2004 012 248 T2 | 3/2009 |
| DE | 10 2009 036 058 A1 | 2/2011 |
| DE | 10 2009 053 267 A1 | 5/2011 |
| DE | 10 2010 043 250 A1 | 5/2012 |
| DE | 11 2010 002 845 T5 | 11/2012 |
| DE | 10 2011 118 551 A1 | 5/2013 |
| WO | 2008/012160 A1 | 1/2008 |

OTHER PUBLICATIONS

German Search Report Corresponding to 10 2014 207 082.1 mailed Jan. 7, 2015.
German Office Action Corresponding to 10 2014 207 087.2 mailed Jan. 7, 2015.
German Office Action Corresponding to 10 2014 207 088.0 mailed Jan. 7, 2015.
German Office Action Corresponding to 10 2014 207 117.8 mailed Jan. 7, 2015.

\* cited by examiner

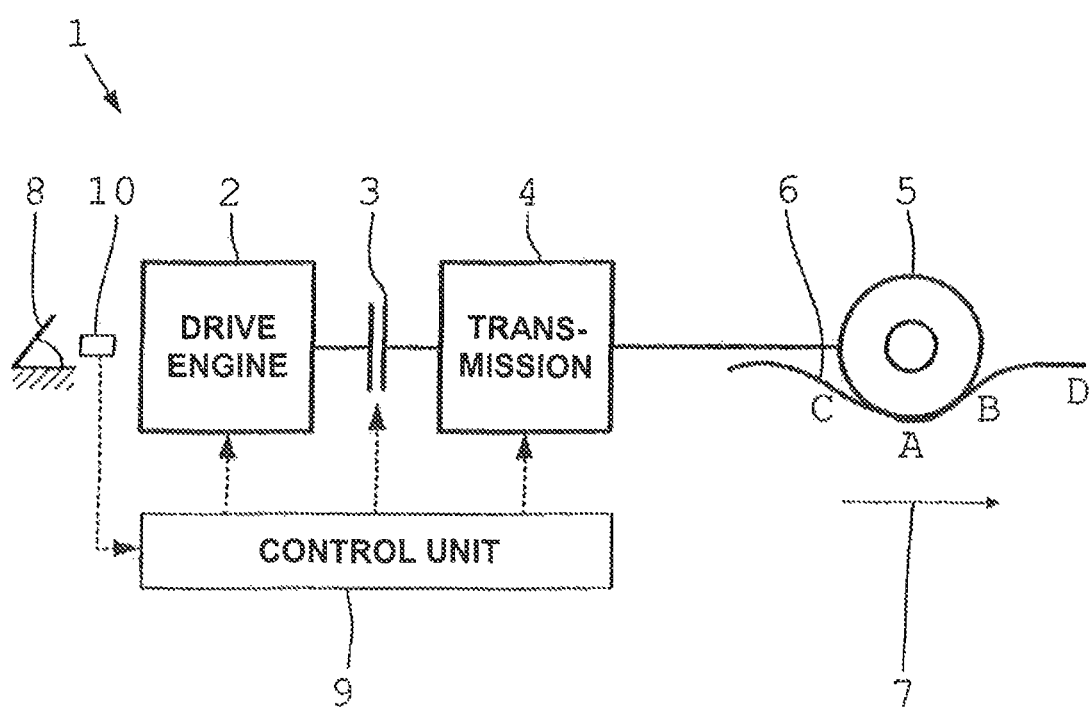

METHOD FOR FREEING A VEHICLE BY ROCKING

This application claims priority from German patent application serial no. 10 2014 207 082.1 filed Apr. 14, 2014.

FIELD OF THE INVENTION

The invention concerns a method for rocking free a motor vehicle having a drive-train with an automatically controllable element for adjusting the drive torque, by means of which drive torque can be transmitted to at least one drivable vehicle wheel, wherein when a driver of the motor vehicle deflects an accelerator pedal to an accelerator pedal position different from a non-actuated position, a desired drive torque can be called for, wherein the drive' torque adjusting element can be controlled as a function of the accelerator pedal position in relation to the drive torque it transmits, and wherein, in a rocking-free situation in which at least one vehicle wheel has to be moved clear of a depression, the driver produces a cyclically fluctuating drive torque at the at least one drivable vehicle wheel by alternately deflecting and releasing the deflection of the accelerator pedal.

BACKGROUND OF THE INVENTION

A vehicle that has become stuck in a depression-like hollow with spinning wheels, so that the vehicle cannot be driven directly out of the depression because the subsoil friction is insufficient or the subsoil is too yielding, can often be freed from that situation by a so-termed rocking-free maneuver. One possibility for emerging from the depression without outside help consists in rocking the vehicle by driving it cyclically forward and in reverse. In physical terms the forward and backward driving or forward and backward rolling vehicle constitutes an oscillating system which can be energized by a suitable input of energy until the kinetic energy suffices to overcome the edge of the depression.

In vehicles with a manual transmission, the driver can carry out a rocking-free process of that kind by rhythmic actuation of the starting clutch and the accelerator pedal and by repeatedly changing between forward and reverse driving, in order successively to rock the vehicle free.

In vehicles with an automated or automatic transmission automatic rocking-free modes are known, which the driver can switch into or which are automatically engaged by virtue of an automatic rocking-free recognition function. The rocking-free process itself then takes place automatically such that a periodically increasing and decreasing drive torque in the forward and/or the reverse direction is produced. The drive torque can for example be produced by a combustion engine, while a gear of the transmission is automatically engaged or disengaged or while a shift automatically takes place repeatedly between a forward gear and a reverse gear. In the case of a hybrid or electric drive, the drive direction can be changed almost without any delay by alternating the direction of current flow in an electric drive motor.

DE 10 2010 043 250 A1 describes a method for the automatic rocking-free of a motor vehicle having an automatic or automated transmission. A rocking-free function is started if a rocking-free situation is recognized automatically for the motor vehicle or if the driver specifies the same by actuating an operating element, and the function is automatically terminated when the motor vehicle reaches a travel-path dependent or a time-dependent limit. Starting from a position with a stationary wheel in a depression from which the motor vehicle has to be moved clear, to rock it free a drive torque is first built up which acts in a desired travel direction determined by the gear engaged until the motor vehicle moving in the desired travel direction reaches a forward travel direction reversal point of the depression. This reversal point is recognized in that the speed of a non-driven wheel falls to zero or the movement direction of the motor vehicle is reversed. The drive torque is then reduced until the motor vehicle, now moving in a direction opposite to the desired travel direction, reaches a rearward travel direction reversal point, and is then built up again. The process is repeated cyclically, whereby the locations of the reversal points are continually adapted and successively migrate out of the depression until the motor vehicle reaches a forward or rear limit point which marks the end of the depression. The limit points are defined by an admissible travel path from the starting position in the relevant travel direction or by an admissible time during which the drive torque is applied, and are continually adapted.

During rocking free, in addition to the alternate build-up and reduction of the drive torque, when the drive torque is reduced the transmission can be shifted to neutral so that in the neutral transmission position the motor vehicle rolls passively backward, or a shift between a forward and a reverse gear can take place so that an active drive torque acts in both rocking directions.

If an electric motor drive is available, then to change between the drive torque acting in the desired travel direction and the drive torque acting in the opposite direction there is no need for a gear change, since the torque direction can be changed by means of the electric drive.

The rocking free as such is carried out fully automatically. However, the driver can have the option to influence the rocking-free function actively by actuating the accelerator pedal, since the function is activated or deactivated depending on a minimum actuation, i.e. a minimum deflection angle of the accelerator pedal and/or since, depending on the acceleration pedal actuation, in each case a maximum drive torque is determined.

DE 10 2009 036 058 A1 describes a method for rocking a motor vehicle free, in which a dual-clutch transmission has a rocking-free mode such that in a first partial transmission a forward gear and in a second partial transmission a reverse gear are engaged at the same time, and the drive input is automatically switched between the partial transmissions. The rocking-free mode is automatically activated if, within a short time, the driver shifts the transmission repeatedly between forward driving, reversing and neutral. Or else the driver engages the rocking-free mode manually if he recognizes the need for this or when a display recommends this to him. The vehicle is only operated in the rocking-free mode when the driver actuates the accelerator pedal. Furthermore, a distance sensor system ensures that the rocking-free mode is automatically terminated if a collision with an obstacle is possible if rocking-free continues.

In the case of a vehicle with an automated transmission or with an automatic transmission, if the driver does not want fully automatic rocking free, or if no such fully automatic function is available, or if an existing rocking-free function is to be influenced actively by the driver, then a rocking-free function can be carried out and its sequence controlled by alternate actuation and release of the accelerator pedal. A repeated change of the position of a selector lever between its positions for forward drive, reverse and neutral is also possible. For the driver, however, it is difficult to act in phase during rocking free, i.e. to recognize in each case the most favorable time-point for actuating and releasing the accelerator pedal. In addition, owing to the driver's reaction time and the electronic transmission time of the accelerator pedal information to the transmission or clutch control unit and the time taken to convert that information to a corresponding change of a drive torque or a clutch torque, kinetic energy can be lost or dissipated so that the rocking-free process is unnecessarily delayed or even unsuccessful.

SUMMARY OF THE INVENTION

Against this background the purpose of the present invention is to propose a method for rocking a motor vehicle free, by means of which a driver carrying out or at least influencing the rocking-free process is actively and effectively assisted.

This objective is achieved and advantageous design features and further developments of the invention emerge from the description below.

The invention is based on the recognition that during a rocking-free process that he is controlling, the driver of a motor vehicle can be actively and effectively assisted by an automatic drive torque control system, in that the driver's wish, which is converted by actuating the accelerator pedal in the transmission and engine control system into a correspondingly varying drive torque in the drive-train, is interpreted in an anticipatory manner. In particular, in a rocking-free situation an automatic, accelerator-pedal-dependent control of the closing or opening condition of a clutch in the drive-train can be adapted in advance to the probable action of the driver.

Accordingly, the invention starts with a method for rocking free a vehicle having a drive-train that comprises an automatically controllable drive torque adjusting element by means of which a drive torque can be transmitted to at least one drivable vehicle wheel, wherein by deflecting an accelerator pedal to a position different from the undeflected pedal position the driver of the vehicle can call for a desired drive torque, wherein depending on the accelerator position the drive torque adjusting element can be controlled in relation to the drive torque it can transmit, and wherein, in a rocking-free situation in which at least one vehicle wheel has to be moved clear of a depression, the driver produces a cyclically fluctuating drive torque at the at least one drivable vehicle wheel by alternately deflecting and releasing the deflection of the accelerator pedal.

To achieve the stated objective, in this method it is provided that the accelerator pedal position is continually monitored, and when a beginning or shortly to begin reduction of the accelerator pedal deflection or a parameter derived therefrom is recognized, it is concluded that a complete release of the deflection of the accelerator pedal is imminent, and after such a recognition, by means of an anticipatory actuation of the drive torque adjusting element the at least one drivable vehicle wheel is directly freed from a drive torque that has been acting until then.

At this point it should be mentioned that the method can be implemented not only with an accelerator pedal as described below, but in a derivative sense also with some other actuating element by means of which the driver's wish can similarly be signaled. The element can for example be a manual throttle, or the like.

In a driver-controlled rocking-free process of a vehicle having an automatic or automated transmission, the driver seeks at each cycle to input as much kinetic energy as possible into the vehicle oscillating in the longitudinal direction. During this the engine and transmission control units regulate the drive engine, the transmission and the clutch in accordance with the driver's wish expressed by means of the accelerator pedal. In a concrete rocking-free situation the driver seeks, by actuating the accelerator pedal, in each case to produce as high as possible a drive torque without causing the drive wheel or wheels to spin by slipping within the depression. If the wheels begin spinning, a reversal point of the movement has been reached at which the vehicle begins or tends to move in the opposite direction. The driver must now release the accelerator pedal as quickly as possible so that the automatically controlled clutch opens quickly and the still existing clutch torque is reduced. So long as a positive clutch torque is still present, the rolling back of the vehicle will be braked and therefore energy dissipated from the vehicle.

By virtue of the method according to the invention the disadvantages are avoided, which are caused by a reaction-time-conditioned, phase-displaced action by the driver when moving his foot to release the deflection of the accelerator pedal, and by technically caused time delay in converting the rapidly changing accelerator pedal information into the actuation of the drive torque adjusting element, such as the opening of a starting clutch. This is achieved by an anticipatory drivers wish evaluation and, following from this, an anticipatory control of a drive torque production or drive torque transmission in the drive-train during rocking free. For example, during rocking free the driver is assisted by clutch control that is operated in advance. Thus, the rocking-free process can be carried out more effectively than before, and therefore more quickly and with a greater chance of success.

During a rocking-free process that the driver is controlling or if he intervenes in an automatic rocking-free function by repeatedly actuating the accelerator pedal and then returning it again to the undeflected position in order to rock the vehicle free, in this operating mode the automatically controlled clutch follows with a cyclic opening and closing adapted to that. With this invention that is used in order, from an initiated accelerator pedal deflection, to anticipate a complete release of the accelerator pedal so that it can revert to its undeflected position. Correspondingly, already when the reduction of the accelerator pedal deflection is recognized the clutch is controlled as if the accelerator pedal were no longer being actuated. In other words the clutch is immediately opened completely, so that already when it begins rolling back into the depression the vehicle is not braked by a counterproductively acting drive torque. This facilitates and speeds up the rocking-free of the vehicle, so that the vehicle can break free from its stuck situation more quickly. The reduction of the accelerator pedal deflection can be recognized in various ways, as shown by the following example embodiments.

In a first preferred embodiment of the invention it can be provided that a reduction of the deflection of the accelerator pedal is recognized if an accelerator pedal deflection gradient, which indicates the temporal change of the deflection of the accelerator pedal, adopts a negative value or at least a value smaller than a specified threshold value.

Accordingly, in the simplest case it can be assumed that the driver will fully release the accelerator pedal as soon as a release of the accelerator pedal is detected by a sensor. Basically, it is even possible already to anticipate an imminent release of the accelerator pedal if the driver is holding the accelerator pedal constantly deflected in one position, or only deflects it a slight amount more without producing a significant forward impulse.

In a further preferred embodiment of the invention it can be provided that a minimum position, which corresponds to an accelerator pedal position at a current minimum deflection of the accelerator pedal, and a maximum position, which corresponds to a current maximum deflection of the accelerator pedal, are detected and are continually followed and stored in relation to their actual values, and a reduction of the deflection of the accelerator pedal is recognized when the deflection of the accelerator pedal changes relative to the maximum position by more than a specified value in the direction toward the undeflected position of the accelerator pedal, and after a reduction of the accelerator pedal deflection has been recognized, the stored value of the maximum position is reset to the stored value of the minimum position.

At this point it should be explained that the current minimum position and the current maximum position of the accelerator pedal deflection are not the end positions of the technically possible maximum and minimum respective accelerator pedal deflections, but the accelerator pedal deflections set during an oscillation phase of a rocking-free process by the driver by the respective actual accelerator pedal deflections during this. Thus the maximum position, which corresponds to the accelerator pedal position in an oscillation phase, can amount for example to 75% of the technically maximum possible accelerator pedal deflection. In this example, during the oscillation phase of a rocking-free process the driver deflects the accelerator pedal only through a maximum of 75%, in order to avoid spinning of the vehicle wheels. This current maximum accelerator pedal deflection value is observed by the method in relation to a reduction thereof during the oscillation phase, and then treated in accordance with the method.

In this method the process reacts somewhat less sensitively to the driver's foot movements to deflect the accelerator pedal. In that way an inadvertently premature opening of the clutch is safely avoided.

The driver's wish at the time is represented directly by the accelerator pedal position. It is also possible, instead of the accelerator pedal position, to use a parameter that depends on or is derived from the accelerator pedal position to implement the method. Such a parameter can be, for example, an engine torque controlled by an engine control unit, which corresponds to the driver's wish for the longitudinal propulsion of the vehicle. Such a parameter can also be a target transmission torque of the clutch controlled by a transmission control unit, which corresponds to a particular clutch position in the opening or closing direction.

Furthermore it can be provided that the drive torque adjusting element is a starting element in the form of a friction clutch or a hydrodynamic clutch, which when a reduction of the accelerator pedal deflection is recognized, is immediately opened or adjusted to a non-torque-transmitting position, so that an existing association between a particular opening or closing condition, or a particular transmitted torque and a particular accelerator pedal position, is temporarily suspended.

Accordingly, when an accelerator pedal deflection reduction is recognized a target position in the opening direction is stored in the clutch control in a torque-free adjustment range of the clutch, and the clutch is adjusted to that position as quickly as possible.

In the description of the invention thus far, the starting element has been considered to be a friction clutch constituting the drive torque adjusting element. Besides a starting element, which for drive torque transmission connects the transmission to a drive engine or separates it therefrom, a drive aggregate itself, which can be sufficiently rapidly actuated or switched off, can be considered.

Correspondingly, it can also be provided that the drive torque adjusting element is an electric machine which is immediately set or switched to a torque-free condition, when an accelerator pedal deflection reduction is recognized, so that in the case of an existing association between a respective torque produced and a corresponding accelerator pedal position, the association is temporarily suspended.

Thus, the method can also be carried out with an electric motor as the drive torque adjusting element. The current can be quickly cut off from an electric machine, so that when an accelerator pedal deflection reduction is recognized the drive torque at the driven vehicle wheel or wheels in the depression can be eliminated. For example, that can be done in an electric vehicle or a vehicle with hybrid drive.

Furthermore, with this method an interruption criterion can be provided, by means of which the anticipatory actuation of the drive torque adjusting element can be terminated, whereby a previously suspended association between a particular opening or closing condition or a particular transmissible torque or a particular torque produced by the drive torque adjusting element and a particular accelerator pedal position, is re-established.

Since relative to the driver's wish as signaled by the actuation of the accelerator pedal the clutch or drive torque adjusting element is opened in anticipation, it is appropriate for the method to provide an interruption criterion for the case when the driver, contrary to expectation, does not completely release the accelerator pedal after a reduction of the accelerator pedal deflection has been recognized.

In this case it can be provided that the interruption criterion is fulfilled if, after the recognition of an accelerator pedal deflection reduction, the accelerator pedal gradient again assumes a positive value.

It can also be provided that a minimum position that corresponds to a current minimum deflection of the accelerator pedal, and a maximum position that corresponds to a current maximum deflection of the accelerator pedal, are detected and continually followed in relation to their actual values and stored, and that an interruption of the anticipatory actuation of the drive torque adjusting element takes place if, compared with the minimum position, the deflection of the accelerator pedal changes by more than a specified amount in the direction toward the full deflection of the accelerator pedal, and after the interruption of the anticipatory actuation of the drive torque adjusting element, the stored value of the minimum position is reset to the stored value of the maximum position.

In addition it can be provided that the interruption criterion is fulfilled if, within a specified time interval after the recognition of the accelerator pedal deflection reduction, the position of the accelerator pedal does not correspond to the position of an accelerator pedal which is completely undeflected or nearly so.

If at least one of the interruption criteria is satisfied, the anticipatory actuation of the drive torque adjusting element in the direction toward cutting off the drive from the driven vehicle wheels is terminated and the target adjustment of the drive torque adjusting element, for example the target position of the clutch, is reset again to a setting normally associated with the accelerator pedal position. In the event of an interruption of the anticipatory actuation of the drive torque adjusting element, if necessary previously stored values for a minimum and for a maximum position of the accelerator pedal can also be reset.

The invention can be used both with passenger cars and in commercial vehicles with automated or automatically controllable drive-trains, to assist the driver when the vehicle is in a rocking-free situation, during a rocking-free process that he controls.

BRIEF DESCRIPTION OF THE DRAWINGS

For the further clarification of the invention there follows the description of a single drawing representing an example embodiment. In the sole drawing, the single FIGURE shows a schematic representation of a drive-train for implementing a method for rocking a vehicle free in accordance with the invention.

DETAILED DESCRIPTION OF THE PREFERRED EMBODIMENTS

According to this, a drive-train 1 of a motor vehicle shown in the FIGURE comprises a drive engine 2 in the form of an internal combustion engine, which can he brought into driving connection by means of a starting clutch 3 in the form of a friction clutch with an automated transmission 4. A drive output of the transmission 4 is in driving connection with a drivable vehicle wheel 5 by way of a differential transmission and driveshafts (not shown).

The internal combustion engine 2, the starting clutch 3 and the transmission 4 are connected by means of sensor and control leads represented by dotted lines, to a control unit 9 by which they can be controlled. In addition an accelerator pedal 8 is shown schematically, which can be actuated by a driver to control the drive torque. A driver's wish signaled by actuating the accelerator pedal 8 is detected by an accelerator pedal deflection sensor 10 and transmitted to the control unit 9, which then carries out the corresponding control and regulation of the internal combustion engine 2, the starting clutch 3 and the transmission 4.

The method for rocking a motor vehicle free is explained with reference to an example scenario. According to this, as indicated in FIG. 1, the motor vehicle is stuck in a depression 6 with the drive wheel 5 owing to slippery or yielding subsoil, so that the motor vehicle is in a rocking-free situation from which it must break free by driving out of the depression 6.

The motor vehicle is first at a position A, namely the deepest point of the depression 6. The driver wishes to rock it free in order to start off, and he deflects the accelerator pedal 8 starting from an undeflected position. When a starting gear of the transmission 4 is engaged, the internal combustion engine 2 builds up a drive torque in the desired travel direction 7. The motor vehicle should preferably also emerge from the depression in this travel direction. The motor vehicle moves toward the position B, which is an edge of the depression ahead of it, but at position B comes to a standstill because of slipping of the wheel 5 and/or because the drive torque is insufficient. In the present situation this position B is a reversal point for the movement of the vehicle, from which the motor vehicle tends to move back in the opposite direction to position A at the deepest point of the depression 6.

In this situation the driver releases the deflection of the accelerator pedal 8 in order to allow the motor vehicle to roll back into the depression 6. In accordance with known methods, in this rocking-free situation the control unit 9 would only open the starting clutch 3 completely or at least set it to a torque-free condition when the driver had returned the accelerator pedal 8 fully to its undeflected position. However, according to the present invention the control unit 9 recognizes the reduction of the accelerator pedal deflection by virtue of a measured negative accelerator pedal gradient, interprets this as the driver's intention to release the accelerator pedal 8 completely, and immediately initiates the opening or torque-free setting of the starting clutch 3 so that the latter is already completely open or is at least not transmitting any torque when the driver has returned the accelerator pedal 8 fully to its undeflected position. In this way the beginning of the rolling-back movement is already not impeded by a clutch torque with a braking effect. By means of the control unit 9, an existing association between the accelerator pedal position and the condition of the clutch is then re-established. This association can for example take place when the control unit 9, during a travel movement following the vehicle's standstill at the edge of the depression 6 in which the vehicle's speed increases again, has detected a reduction of the travel speed.

The vehicle now rolls freely in the direction opposite to the desired travel direction 7, and above position A its potential energy is converted to kinetic energy. At the opposite position C the vehicle again comes to a standstill because its kinetic energy still does not suffice to overcome the potential of the depression 6. Accordingly, the driver again actuates the accelerator pedal 8 in order to produce a drive torque in the desired travel direction 7. Correspondingly, the starting clutch 3 is automatically closed. If now the kinetic energy input into the vehicle is sufficient and the vehicle therefore rocks free far enough in the longitudinal direction, the speed at position B in the desired travel direction 7 remains greater than zero so that the vehicle can overcome the edge of the depression and reach position D. Otherwise the process is repeated, until the vehicle breaks free.

LIST OF INDEXES

1 Drive-train
2 Drive engine
3 Drive torque adjusting element, starting clutch
4 Automated transmission
5 Vehicle wheel
6 Depression
7 Desired travel direction
8 Accelerator pedal
9 Control unit
10 Accelerator pedal deflection sensor
A First rocking-free position
B Second rocking-free position
C Third rocking-free position
D Fourth rocking-free position

The invention claimed is:

1. A method of driver-assisted rocking a motor vehicle free from a depression (6), the vehicle comprising a drive-train (1) having an automatically controllable drive torque adjusting element (3) by which drive torque can be transmitted to at least one drivable vehicle wheel (5), when a driver of the motor vehicle deflects an accelerator pedal (8) to an accelerator pedal position different from an unactuated position, the drive torque adjusting element (3) being controlled as a function of the accelerator pedal position in relation to the drive torque that can be transmitted by the drive torque adjusting element (3), and, in a rocking-free situation in which at least one vehicle wheel (5) has to be moved clear of the depression (6), by the driver alternating between deflection of the accelerator pedal (8) and release of the deflection of the accelerator pedal (8), the driver thereby producing a cyclically fluctuating drive torque at the at least one drivable vehicle wheel (5), the method comprising:

continually monitoring the accelerator pedal position;
upon recognizing a beginning, or an imminently beginning reduction of the deflection of the accelerator pedal, or a parameter derived therefrom, concluding that a full release of the deflection of the accelerator pedal is imminent; and
upon concluding that the full release of the deflection of the accelerator pedal is imminent, activating the drive torque adjusting element (3) in anticipation of the reduction in the accelerator deflection so that the at least one drivable vehicle wheel (5) is immediately freed from drive torque that was active before the accelerator pedal reaches the unactuated position, thereby assisting the driver in a rocking-free situation to move the at least one drivable vehicle wheel (5) clear of the depression (6).

2. The method according to claim 1, further comprising recognizing a release of the deflection of the accelerator pedal (8) when an accelerator pedal deflection gradient, indicating a temporal change of the deflection of the accelerator pedal (8), adopts a negative value or at least adopts a value that is smaller than a specified threshold value.

3. The method according to claim 1, further comprising:
detecting a minimum deflection of the accelerator pedal (8) position, which corresponds to an accelerator pedal position after a current minimum deflection of the accelerator pedal (8), and a maximum deflection of the accelerator pedal (8) position, which corresponds to a current maximum deflection of the accelerator pedal (8),
continually monitoring the minimum deflection of the accelerator pedal (8) position and the maximum deflection of the accelerator pedal (8) position and storing the minimum deflection of the accelerator pedal (8) position and the maximum deflection of the accelerator pedal (8) position as stored values in relation to actual pedal position values,
recognizing the reduction of the deflection of the accelerator pedal (8) when the deflection of the accelerator pedal (8) changes, compared with the maximum deflection of the accelerator pedal (8) position, by more than a specified amount in a direction toward the unactuated position of the accelerator pedal (8), and
when a reduction of the deflection of the accelerator pedal (8) is recognized, resetting the stored value of the maximum deflection of the accelerator pedal (8) position to the stored value of the minimum deflection of the accelerator pedal (8) position.

4. The method according to claim 3, further comprising resetting the stored value of the minimum deflection of the accelerator pedal (8) position to the stored value of the maximum deflection of the accelerator pedal (8) position if the deflection of the accelerator pedal (8) changes relative to the minimum deflection of the accelerator pedal (8) position by more than a specified amount in a direction toward a full deflection of the accelerator pedal (8), and after an interruption of an anticipatory actuation of the drive torque adjusting element (3).

5. The method according to claim 1, further comprising using a starting element in a form of a friction clutch or a hydrodynamic clutch as the drive torque adjusting element (3), which when a reduction of the deflection of the accelerator pedal (8) is recognized, the drive torque adjusting element (3) is immediately disengaged or adjusted to transmit no torque to the at least one drivable vehicle wheel (5), and temporarily suspending an existing association between a particular torque that can be transmitted and a particular accelerator pedal position.

6. The method according to claim 1, further comprising using an electric machine as the drive torque adjusting element (3), and when the reduction of the deflection of the accelerator pedal (8) is recognized, immediately adjusting the drive torque adjusting element (3) to transmit no torque to the at least one drivable vehicle wheel (5), and if there is an existing association between a particular torque produced and a particular accelerator pedal position, temporarily suspending the association.

7. The method according to claim 1, further comprising providing an interruption criterion when, after the recognition of a reduction of the accelerator pedal deflection, an accelerator pedal gradient assumes a positive value again such that there becomes a direct association between a particular torque produced and a particular accelerator pedal position.

8. The method according to claim 7, further comprising providing the interruption criterion if, within a specified time interval after the recognition of a reduction of the deflection of the accelerator pedal (8), the accelerator pedal position does not correspond to an accelerator pedal (8) being in the unactuated position.

9. A method of driver-assisted rocking of a motor vehicle free from a depression, the method comprising:
continually monitoring an accelerator pedal position when a wheel of the vehicle is stuck in the depression;
recognizing a beginning of a reduction of deflection of an accelerator pedal by a driver; and
upon recognizing the beginning of the reduction of deflection of the accelerator pedal by the drive, concluding that a full release of the deflection of the accelerator pedal is imminent and immediately activating a drive torque adjusting element, by which drive torque is transmitted to at least one drivable vehicle wheel, to free the at least one drivable vehicle wheel from the drive torque, before the accelerator pedal reaches an unactuated position, thereby assisting the driver in the rocking-free situation to move the at least one drivable vehicle wheel clear of the depression.

10. The method according to claim 9, further comprising recognizing the beginning of the reduction of the deflection of the accelerator pedal when an accelerator pedal deflection gradient, indicating a temporal change in the deflection of the accelerator pedal, adopts a negative value or at least adopts a value that is smaller than a specified threshold value.

11. The method according to claim 10, further comprising providing an interruption criterion for the driver-assisted rocking-free situation when the accelerator pedal gradient assumes a positive value such that there becomes a direct association between a particular torque produced and a particular accelerator pedal position.

12. The method according to claim 11, further comprising providing the interruption criterion if, within a specified time interval after the recognition of a reduction of the deflection of the accelerator pedal, the accelerator pedal position does not correspond to the unactuated position.

13. The method according to claim 9, further comprising:
detecting a minimum deflection of the accelerator pedal position;
detecting a maximum deflection of the accelerator pedal position;

continually monitoring the minimum deflection of the accelerator pedal position and the maximum deflection of the accelerator pedal position;

storing the minimum deflection of the accelerator pedal position and the maximum deflection of the accelerator pedal position as stored values in relation to respective actual accelerator pedal position values;

recognizing a reduction of the deflection of the accelerator pedal when the deflection of the accelerator pedal changes, compared with the maximum deflection of the accelerator pedal position, by more than a specified amount in a direction toward the unactuated position; and when the reduction of the deflection of the accelerator pedal is recognized, resetting the stored value of the maximum position to the stored value of the minimum position.

14. The method according to claim 13, further comprising resetting the stored value of the minimum deflection of the accelerator pedal position to the stored value of the maximum deflection of the accelerator pedal position when the deflection of the accelerator pedal changes relative to the minimum position by more than a specified amount in the direction toward the full deflection of the accelerator pedal.

15. The method according to claim 9, further comprising using a friction clutch or a hydrodynamic clutch as the drive torque adjusting element.

16. The method according to claim 9, further comprising using an electric machine as the drive torque adjusting element.

17. A method of driver-assisted rocking of a motor vehicle free from a depression, the method comprising:

continually monitoring an accelerator pedal position, when the vehicle is stuck in the depression, to recognize a beginning of a reduction of deflection of an accelerator pedal by a driver; and upon recognizing the beginning of the reduction of the deflection of the accelerator pedal, concluding that a full release of the deflection of the accelerator pedal is imminent and immediately initiating disengagement of a starting clutch so that, before the accelerator pedal is returned to its undeflected position, the starting clutch is no longer transmitting any torque to at least one vehicle wheel.

* * * * *